Dec. 3, 1963  D. W. NORWOOD  3,112,684
LIGHT RESPONSIVE CAMERA
Filed July 27, 1959  3 Sheets-Sheet 1
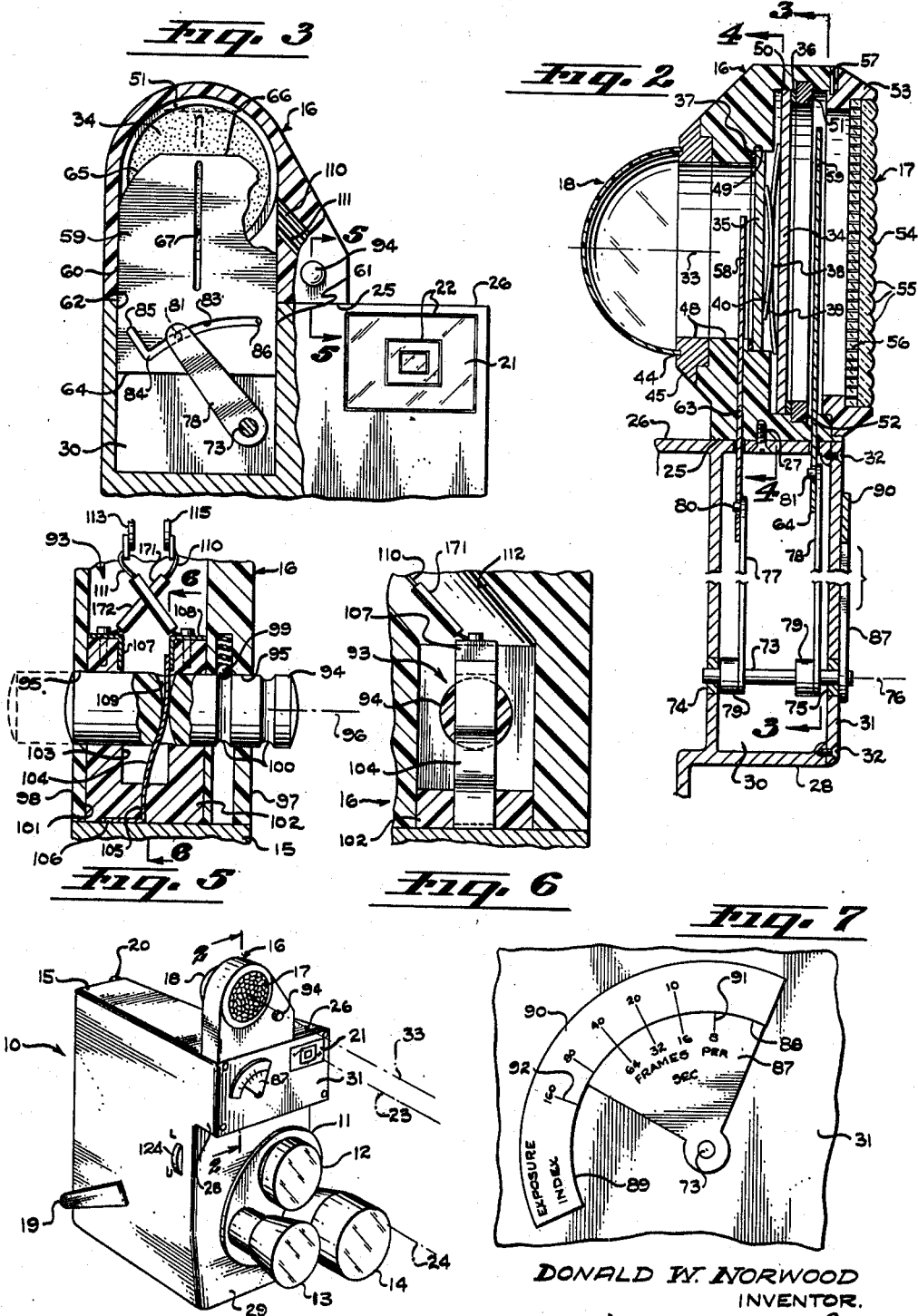
DONALD W. NORWOOD
INVENTOR.
BY William P. Green
ATTORNEY Dec. 3, 1963
D. W. NORWOOD
3,112,684
LIGHT RESPONSIVE CAMERA
Filed July 27, 1959
3 Sheets-Sheet 2
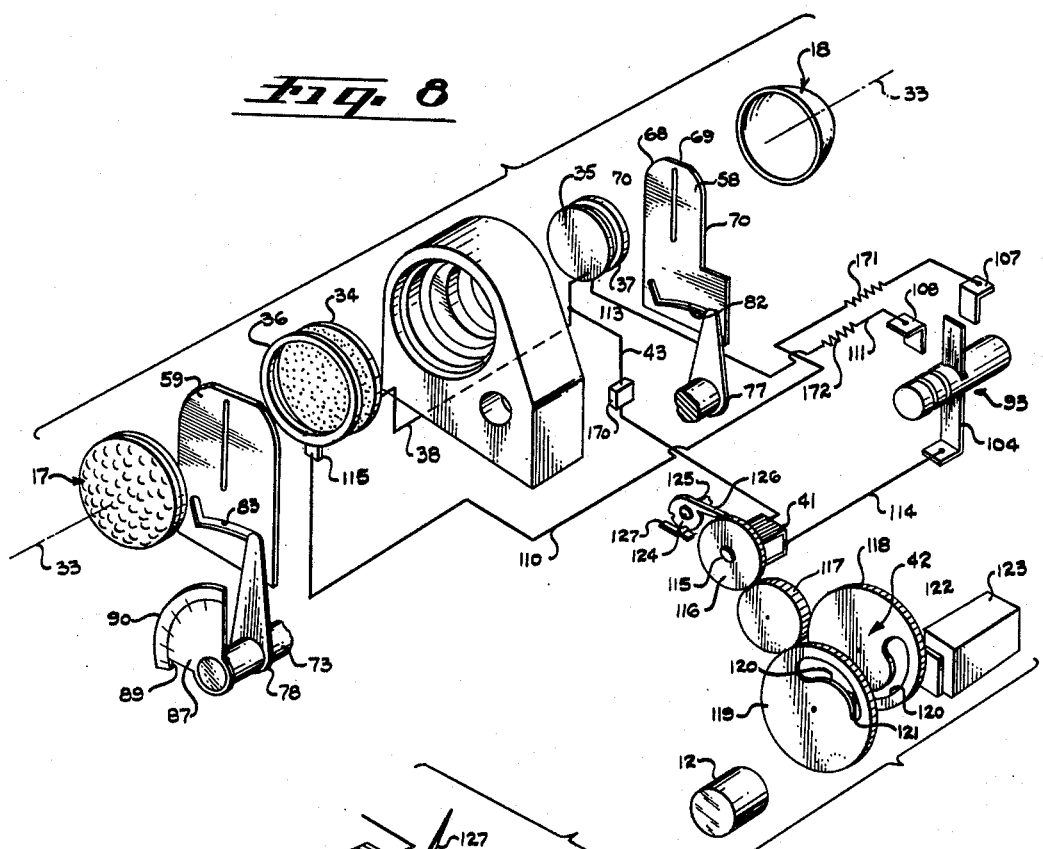
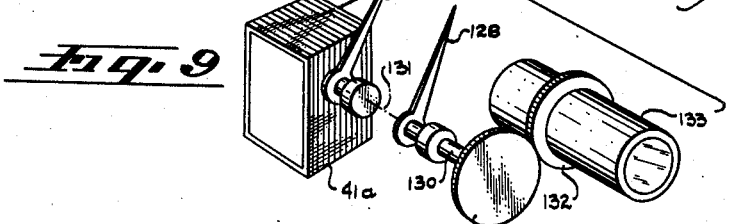
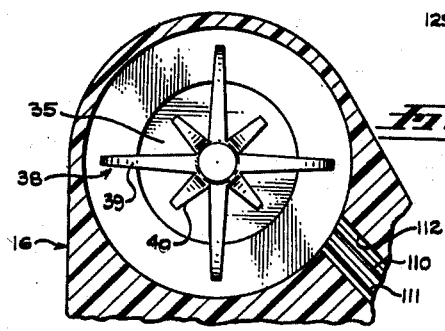
DONALD W. NORWOOD
INVENTOR
BY William P. Green
ATTORNEY Dec. 3, 1963  D. W. NORWOOD  3,112,684
LIGHT RESPONSIVE CAMERA
Filed July 27, 1959  3 Sheets-Sheet 3
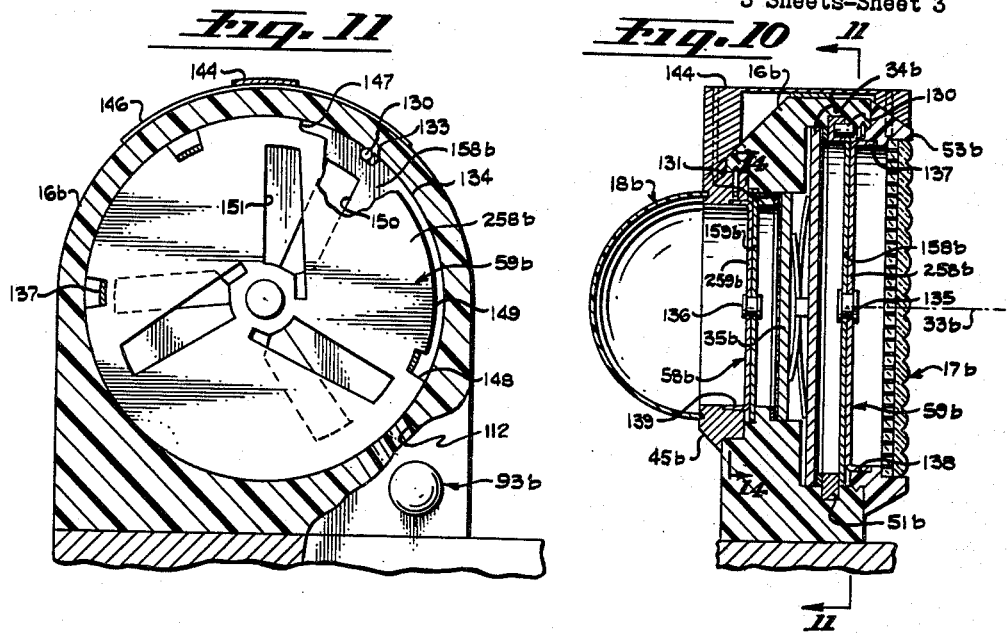
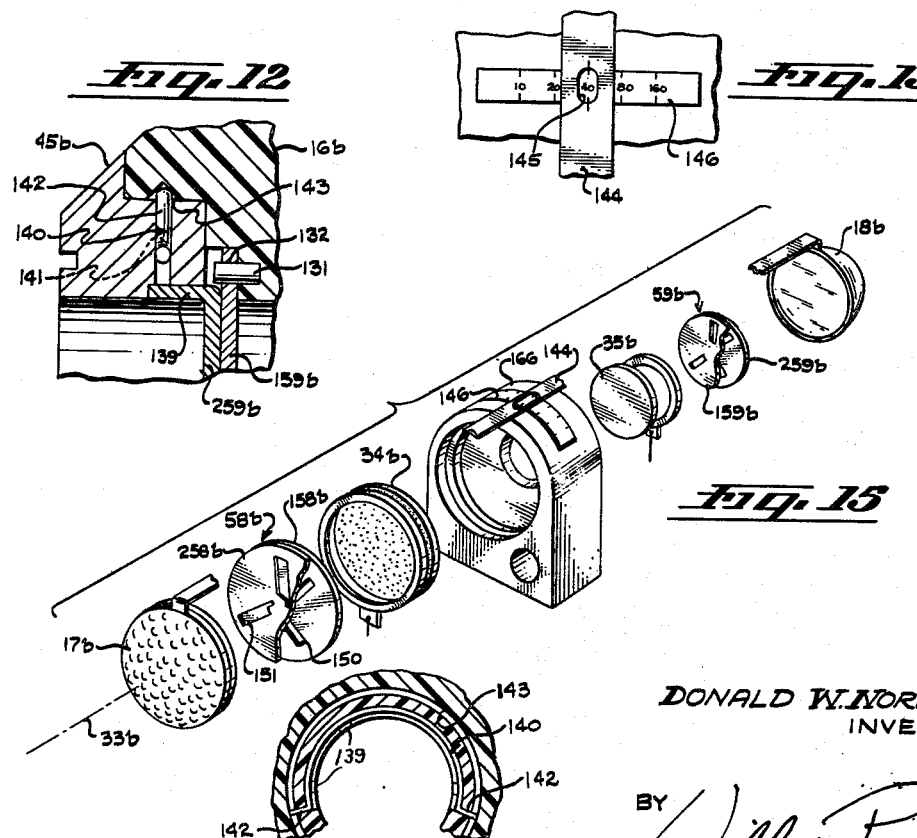
DONALD W. NORWOOD
INVENTOR
BY William P. Breen
ATTORNEY

United States Patent Office 3,112,684
Patented Dec. 3, 1963

3,112,684
LIGHT RESPONSIVE CAMERA
Donald W. Norwood, 1470 San Pasqual St.,
Pasadena, Calif.
Filed July 27, 1959, Ser. No. 829,873
9 Claims. (Cl. 95—64)

This invention relates to improved apparatus for electricaly actuating an exposure control of a camera in accordance with the intensity of light at the camera location.

Very widespread popularity is currently being enjoyed by the various automatic light responsive cameras which have recently been placed on the market. In these cameras, a photoelectric cell is provided which automatically responds to the light emanating from a photographic subject, and then electrically actuates an iris mechanism to a proper lens aperture setting for the amount of light received by the cell. Also enjoying popularity are some semi-automatic cameras, which function the same as the automatic cameras except that the operator must manually align a follower pointer with an electrically controlled pointer in order to effect to proper lens aperture setting.

Though these automatic and semi-automatic light actuated cameras are very appealing to the amateur photographer, by reason of their simplicity of operation, the photographic results achieved by cameras of this type, to date, have definitely been inferior to the results which can be attained by the use of a conventional camera and a high quality light meter capable of taking incident light readings. These poor results have resulted primarily from the fact that automatic and semi-automatic cameras as designed thus far have been limited to reflected light actuation, and therefore can produce good exposures only in the very limited number of photographic situations in which reflected light readings are satisfactory. In general photographic practice, however, many situations are encountered in which only incident light readings can properly determine exactly what lens aperture setting should be employed on the camera. This is true for example in many scenes which contain side lighting or back lighting, or scenes in which the background is much lighter or much darker than the foreground subject.

A major object of the present invention is to provide an automatic or semi-automatic type of camera structure which is capable of overcoming the above discussed disadvantages of prior cameras of this type, and which in particular is adapted to respond to the amount of incident light to which the photographic subject is exposed, to in this way attain the increased precision of camera setting which is inherent in the use of incident light readings in many situations. Particularly contemplated is an arrangement in which the camera is selectively actuable by either incident light or reflected light, to attain the very decided advantages of incident light measurement for most photographic situations, and in addition to attain the more limited benefits of reflected light measurement for those scenes in which reflected light actuation is desirable. Thus, the camera is extremely versatile in operation, and will effectively handle every type of scene which may be encountered by a photographer, and in all of those different situations is capable of automatic or semi-automatic operation.

In order to allow for automatic response to incident light at the camera location, the camera is provided with an incident light acceptance unit, preferably a translucent hemispherical dome, which faces in a direction opposite to the direction in which the camera lens faces. In such a position, the hemispherical light collector will be correctly oriented to represent the camera side of a three-dimensional photographic subject. A cell is responsive to the light collected by this light acceptance unit, and may electrically and automatically actuate an iris mechanism in accordance with the light energization of the cell, to automatically set the iris to a lens aperture setting which is proper for the amount of incident light to which the device is subjected. In order to assure optimum exposure of the acceptance unit to the incident light present at the camera location, I find it desirable to mount this acceptance unit on an upwardly projecting reduced dimension portion of the camera housing, so that the photographer's head and body will not interfere appreciably with the passage of light to the acceptance unit.

To allow for both reflected light and incident light response, I prefer to employ two photoelectric cells facing in opposite directions, one cell being associated with an incident light acceptance unit as previously mentioned, and the other being associated with a reflected light acceptance unit facing in the same direction as the camera lens. In conjunction with these two acceptance units, there may be provided a selector control, for determining whether the incident light cell or the reflected light cell is operative at a particular time, this control preferably taking the form of electrical switching means operable to selectively connect either of the two cells to a common electrically operated microammeter or the like. In addition to this selector apparatus, I find it desirable to employ presetting mechanism for taking into account the photographic exposure factors of film sensitivity and camera shutter time. This presetting arrangement should consist of two light valves associated with the two photoelectric cells respectively, and preferably interconnected for actuation in unison by a common control element. These valves, as well as the sensitivities of the two cells and the transmission characteristics of the two light acceptance units, may all be so interrelated that, with the interconnected valves in any particular setting, the electrically actuated element controlled by the two cells will be actuated to the same extent by either cell if the camera is pointed toward the subject, and if the scene is a typical "perfect" scene in which 18 percent of the light impinging on the scene is reflected toward the camera.

The above and other features and objects of the present invention will be better understood from the following detailed description of the typical embodiments illustrated in the accompanying drawings in which:

FIG. 1 is a perspective view of a first form of automatic light responsive motion picture camera constructed in accordance with the invention;

FIG. 2 is an enlarged fragmentary vertical section taken on line 2—2 of FIG. 1;

FIG. 3 is a reduced fragmentary vertical section taken on line 3—3 of FIG. 2;

FIG. 4 is a fragmentary vertical section taken on line 4—4 of FIG. 2;

FIG. 5 is an enlarged fragmentary vertical section taken on line 5—5 of FIG. 3;

FIG. 6 is a transverse section taken on line 6—6 of FIG. 5;

FIG. 7 is an enlarged front view of the presetting control of the camera;

FIG. 8 is an exploded perspective view of the light responsive mechanism of the said FIG. 1 camera;

FIG. 9 is an exploded somewhat diagrammatic and fragmentary perspective view of a variational type of camera, adapted for only semi-automatic actuation;

FIG. 10 is a view similar to FIG. 2 but showing a variational form of a light responsive head;

FIG. 11 is a vertical section taken on line 11—11 of FIG. 10;

FIG. 12 is a fragmentary enlarged section through a portion of the FIG. 10 device;

FIG. 13 is a view representing the markings on the FIG. 10 device;

FIG. 14 is a view representing the retaining spring of the FIG. 10 device; and

FIG. 15 is an exploded perspective view of the unit of FIGS. 10 through 15.

With reference first to FIGS. 1 through 8, and particularly FIG. 1, I have shown at 10 a motion picture camera, typically having a rotary turret 11 at its forward end carrying three lenses 12, 13 and 14 adapted to be selectively moved to active picture taking position. The housing of the camera includes a main relatively large portion 15 containing the bulk of the mechanism of the camera, and carrying a reduced dimension upwardly projecting housing portion 16 to which a reflected light acceptance unit 17 and an incident light acceptance unit 18 are mounted. The mechanism contained within main body section 15 of course includes the usual film advancing mechanism for successively advancing different frames of a motion picture film to a predetermined position of exposure to an image received through the active one of the three lenses 12, 13 and 14. Also, there is contained within main housing portion 15 the usual shutter mechanism, power operated in timed relation to the actuation of the film advancing mechanism to open the light path from the lens to each frame of the film when that particular frame is in proper position for exposure. The spring actuated motor for driving the film advancing mechanism and shutter mechanism is windable by the usual winding arm represented at 19. For indicating to a user exactly what picture is to be taken by the camera when the camera is aimed in a particular direction, there is provided the usual view finder, having an eye piece 20 at the rear end of the camera into which the operator looks, and having a viewing window 21 at the forward end of the camera facing in the same direction as the lens, and typically having different rectangular areas 22 (see FIG. 3) marked off in this transparent viewing window for use with the different lenses. In FIG. 1, the viewing axis of the view finder is represented at 23, and is approximately parallel to the viewing axis 24 of the lens 12 which is located in active position.

The main portion 15 of the camera housing normally takes the form of a hollow metal casting, or an assembly of metal parts, with the upwardly projecting portion 16 of the housing desirably being a separately formed element, typically made of a suitable rigid, opaque resinous plastic material, such as Bakelite (phenol-formaldehyde). As is seen clearly in FIGS. 2 and 3, the upwardly projecting reduced dimension housing part 16 may have a horizontal planar undersurface 25 resting on a horizontal planar upper surface 26 of main housing part 15, with element 16 being secured to the main housing in any suitable manner, as by a number of retaining screws one of which is represented at 27 in FIG. 2. The portion 28 of housing part 15 to which upper part 16 is attached may project forwardly beyond the vertical plane of the rest of the front wall 29 of the camera, and may form within forwardly projecting rectangular portion 28 of the housing, a typically rectangular inner chamber or space 30 within which there is mounted certain mechanism for coaction with the apparatus contained within upper light collecting head 16. Any suitable means may be provided for allowing access to the interior of chamber 30 during manufacture or assembly of the apparatus, as by forming the front wall 31 of portion 28 separately, and removably attaching it to the rest of portion 28 by screws represented at 32.

The upper light receiving head 16 has a passage extending entirely therethrough and centered about an axis 33 which is parallel to axis 24 of the lens 12 which is in active position. Within this passage in head 16 there are positioned two oppositely facing photoelectric cells 34 and 35 associated with the two light acceptance unit 17 and 18 respectively. These cells 34 and 35 may both take the form of circular photovoltaic discs, adapted to produce an output current in response to the impingement of light upon the discs. Refected light cell 34 is larger than cell 35, and has its sensitive side facing axially along axis 33 in the same direction in which lenses 12, 13 and 14 face (to the right as seen in FIG. 2). The incident light responsive cell 35, on the other hand, faces in exactly the opposite axial direction, to the left as seen in FIG. 2. The electrical connections to these sensitized light responsive sides of cells 34 and 35 are effected by means of two annular electrically conductive metal rings 36 and 37 (FIG. 2), which engage the periphery of the sensitive surfaces of the discs. The electrical connection to the other sides of the cells 34 and 35 is made by means of a resilient metal electrically conductive spring 38, having a series of circularly spaced radially projecting fingers 39 turned axially in a first direction to abut against disc 24, with element 38 having a second series of somewhat shorter circularly spaced and radially projecting fingers 40 turned axially to engage the inner surface of photoelectric cell 35. Spring contact 38 is electrically connected to one side of a conventional moving coil type of electrically actuated unit 41 (see FIG. 8) for actuating the iris mechanism 42 of the camera in accordance with the light energization of one of the photoelectric cells 34 or 35. In the exploded diagrammatic representation of FIG. 8, the contact spring 38 is diagrammatically represented at 38, and is connected by a lead 43 to moving coil unit 41. In the lead 43 is placed a thermistor unit 170. The function of this unit is to provide a thermal controlled change of resistance in the circuit, which counteracts thermal caused changes in electrical output from the photovoltaic cells.

The incident light collector unit 18 preferably is a substantially hemispherical translucent dome, centered about a point on axis 33, and facing along that axis in a leftward direction as seen in FIG. 2. Dome 18 may be formed of a suitable translucent resinous plastic material, such as cellulose acetate. The annular base portion 44 of dome 18 is rigidly cemented or otherwise attached to an opaque mounting ring 45, typically formed of metal. Ring 45 is cemented or otherwise secured in any manner to mounting head 16, in the relation shown.

Axially inwardly of the incident light collecting dome 18, ring 45 and head 16 contain aligned cylindrical inner surfaces 48, centered about axis 33, and defining a circular passage for passing light from dome 18 to the light sensitive side of photoelectric cell 35. At the forward end of the surface 48 in part 16, the part 16 forms an annular forwardly facing transverse shoulder 49, against which contact ring 37 abuts, with disc 35 then being pressed axially against ring 37 by spring 38 as previously mentioned. The second photo-voltaic disc 34 and its forward contact ring 36 are contained within an enlarged diameter cylindrical counterbore 50 formed in part 16 and centered about axis 33. At the forward side of ring 36, there is provided a resilient snap ring or split ring 51, which is adapted to be received within an annular groove 52 in part 16 to retain all of the elements 34, 35, 36, 37 and 38 in their illustrated FIG. 2 positions within the interior of part 16. As will be apparent, snap ring 51 is interrupted at one point about its circular extent, so that the ring may be constricted to allow its insertion into part 16 and into groove 52 thereof, but with the resilience of ring 51 then being such as to expand the ring tightly into groove 52 to retain it therein.

At the forwardmost end of part 16, there is provided a ring 53, centered about axis 33, and carrying the reflected light acceptance unit 17. Unit 17 may include a conventional multilenticular light acceptance disc 54 disposed transversely of axis 33, and formed of transparent glass or the like molded to present a large number of small convex lens areas 55 facing forwardly along axis 33. Behind disc 54, there may be provided the usual circular honeycomb element 56, containing a large number of parallel axially extending passages through which light is directed in a manner assisting element 54 in narrowing the acceptance angle of the overall unit 17 to a proper angle for reflected light readings. Parts 54 and 56 may be cemented to ring 53, and this ring may in turn be rigidly secured in any manner to part 16, as by a number of circularly spaced retaining pins, one of which is represented at 57 in FIG. 2. As will be understood, the illustrated manner of construction of the apparatus contained within head 16 allows all of the parts 34, 35, 36, 37, 38 and 51 to be inserted axially into head 16 from its forward side, being retained therein by ring 51, following which ring 53 and the carried reflected light acceptance unit 17 may be attached to part 16 to complete the assembly.

Axially between incident light collector unit 18 and the associated photoelectric cell 35, there is provided a light valve element 58 (see FIGS. 2 and 8) for regulating the percentage of the available light which is permitted to pass from collector unit 18 to cell 35. Similarly, a second light valve element 59 is provided axially between reflected light collector unit 17 and its associated photoelectric cell 34. Both of these valves 58 and 59 may take the form of opaque planar sheet metal plates disposed transversely of axis 33, and each mounted for sliding movement within the plane of that particular plate and therefore transversely of axis 33. In FIG. 2, both of these valves 58 and 59 are shown in their uppermost positions, in which only a minimum amount of light is permitted to pass the valves to cells 34 and 35. To pass more light to the cells, valves 58 and 59 are slidable downwardly, ultimately to their lowermost positions in which no portion of either of the two discs 34 and 35 is covered by valve element 58 or 59.

Referring now to FIG. 3, the valve plate 59 has two vertically extending parallel opposite side edges 60 and 61 which are spaced apart in correspondence with the width of a vertical guideway 62 formed in the lower portion of part 16, within which guideway plate 58 is slidably mounted for only vertical movement. The bottom of plate 59 may be defined by a horizontal bottom edge 64, while the top of plate 59 is defined by an essentially semi-circular edge 65 of a radius somewhat greater than the exposed portion of disc 34, but with this semi-circular edge being interrupted at 66 by a horizontal straight top edge defining a chord of the circle represented by edges 65. There also may be a vertically extended slit 67 formed in plate 59, so that even in the uppermost broken line position of plate 59 (shown in broken lines in FIG. 3), some light can pass to cell 34 past the upper cutaway portion 66 of plate 59 and through slit 67. This slit 67 acts to improve the distribution of light over the area of the cell in the minimum light transmission condition. As the plate 59 is moved downwardly, the effective light passing area of the valve is increased as seen in FIG. 3. As will be apparent, the width of valve plate 59 between its two opposite side edges 60 and 61 is slightly greater than the diameter of the exposed portion of the associated photoelectric cell 34, and corresponds substantially to the diameter of curvature of the upper interrupted arcuate edge 65.

The second valve plate 58 may be considered as being essentially the same as valve 59, except that the upper portion of valve 58 (see FIG. 8) is of reduced width, and its upper arcuate edge 68 and its cutaway area 69 are reduced in size, in correspondence with the reduced diameter of the incident light cell 35, as compared with the diameter of cell 34 with which plate 59 is associated. The two parallel vertical opposite side edges of the upper reduced width portion of valve 58 are slidably received and confined within a vertical guideway 63 in part 16, corresponding to guideway 62 for plate 59.

For actuating the two valves 58 and 59 in unison between their maximum closed and their maximum open positions, I provide an actuating shaft 73 within the previously mentioned chamber 30 in the forward portion of housing 15, with shaft 73 being journalled for rotary adjusting movement by a pair of bearings 74 and 75. The rotary axis 76 of shaft 73 is parallel to axis 33. Within chamber 30, shaft 73 rigidly carries two parallel arms 77 and 78, projecting radially of axis 6, and typically having enlarged hub portions 79 for attaching these arms to the shaft. At its free end, each of the arms 77 and 78 carries an axially projecting short pin or lug 80 or 81, which is received and confined within a slot 82 or 83 of the associated valve plate 58 or 59 in a relation such that swinging movement of arms 77 and 78 about axis 76 serves to cam both of the valve plates upwardly and downwardly in unison. The slot 83 in valve plate 59 is of the configuration represented in FIG. 3. More specifically, starting from the righthand end of that slot as seen in FIG. 3, the elongated slot first curves gradually downwardly as it advances to the left, and to a point 84 at which the slot then returns abruptly upwardly to its other end 85. When arm 78 is in a directly upwardly projecting position, lug 81 is received in the righthand end 86 of slot 83, and the valve plate 59 is in its uppermost position. As arm 78 swings in a counterclockwise direction as seen in FIG. 3, lug 81 advances along slot 83 toward its other end 85, and in doing so causes valve 59 to be shifted progressively downwardly. When arm 78 has been turned through a 90 degree angle, and reaches a horizontally projecting position (projecting to the left in FIG. 3), pin 81 is received within the very end portion 85 of slot 83, and the valve is then in its lowermost position. The design of the valve and slot 83 is such that, in turning through the defined 90 degree angle, the effective light passing area of the valve increase in geometric progression steps while the angular movement of arm 78 advances through only arithmetic progression steps. More specifically, for each 15 degrees of angular movement of arm 78, the effective light passing area of the valve is doubled. A slot of the type illustrated in FIG. 3 at 83 will attain this result, in conjunction with the fact that, as the arm approaches a horizontally projecting position, the vertical component of movement for each 15 degree actuation of the arm increases progressively.

Slot 82 in valve element 58 is of a configuration very similar to slot 83 of valve 59, to actuate valve 58 in essentially the same manner but through a shorter overall vertical distance in view of the smaller diameter of the photoelectric cell 35 as compared with cell 34. As in the case of valve 59, the actuation of valve 58 causes an increase in light passing area of the valve in geometric progression steps (successive doubling steps) while arm 77 is swinging through only arithmetic progression steps. To actuate both of the valve elements 58 and 59, there is connected to the forward end of shaft 73, at an exposed location in front of wall 31, a manually movable thin plate like element 87 (see FIGS. 1, 2, 7 and 8), which may take the form of a segment of a circle having a peripheral edge 88 received adjacent and movable along an arcuate similarly curved edge 89 formed on a curved element 90 attached stationarily to the front of wall 31. Part 87 is rigidly attached to shaft 73, and carries a series of markings 91 spaced along its peripheral edge and coacting with a series of markings 92 formed on part 90. The markings 91 may represent the photographic exposure factor of shutter time, typically given in terms of different numbers of frames per second as shown in FIG. 7, in the case of a motion picture camera. Markings 92 may take the form of a film sensitivity scale, representing different film sensitivities typically between the ASA 10 and ASA 160. The angular spacing between the different markings 10, 20, 40, 80 and 160 on element 90 should be uniform, typically 15 degrees spacing between each pair of successive numbers, and the markings 8, 16, 32 and 64 on part 87 may be similarly spaced uniform distances apart, and the same angular distance as the markings 92 (15 degrees).

For selecting which of the two photoelectric cells 34 or 35 is in control of the iris mechanism at a particular time, I provide a selector switch 93 (see FIGS. 5, 6 and 8) which is operable to selectively connect the two cells to electrically actuated moving coil device 41. This switch 93 is mounted in a laternally projecting portion of the light receiving head 16, and includes a double acting manually controlled push-button element 94, which is mounted within cylindrical bores 95 in part 16 for movement along an axis 96 parallel to the previously mentioned axes 23, 24, and 33. Pin 94 is actuable along axis 96 between the full line position of FIG. 5, in which the pin projects from and beyond the forward surface 97 of part 16, and the broken line position of FIG. 5 in which the opposite end of the pin projects beyond the rear surface 98 of part 16. As will be apparent, the operator actuates the pin between these two positions by pressing its opposite ends as desired. A spring pressed ball detent 99 is mounted within part 16, and is receivable within either of two annular grooves 100 formed in part 94, to releasably retain the push-button in either of its two actuated positions.

In extending through part 16, push-button 94 passes entirely through a vertically extending cylindrical passage 101, within which there is mounted a correspondingly dimensioned cylindrical vertically extending part 102 formed of a suitable electrically insulative resinous plastic material. Part 102 contains a recess 103 extending downwardly from its upper end, and within which there is movably received the upper end of a flexible metal contact 104, whose lower end is stationarily anchored within a slit 105 in part 102. At the lower extremity of this movable contact, the metal of the contact is urned horizontally at 106, for reception within a shallow recess formed at the bottom of part 102, to be effectively confined between part 102 and the upper surface of the camera body 15.

The two halves of part 102 carry two stationary contacts 107 and 108, which are engaged by movable contact 104 in the two actuated positions of push-button 94 (that is in the full line and broken line positions of FIG. 5). In order that the push-button may thus actuate contact 104, this contact 104 extends upwardly through a passage 109 in the push-button, to be shiftable axially upon axial movement of the push-button. The two contacts 107 and 108 are connected to insulated electric wires 110 and 111, which extend upwardly and at an angle through an inclined upper continuation 112 of the passage 101 in part 16, with wires 110 and 111 being connected electrically at their upper ends to a pair of short conductive radially projecting tabs or lugs 115 and 113 on rings 36 and 37 respectively. Movable contact 104 is electrically connected to a second side of the moving coil microammeter type of actuating mechanism 41, as represented by the electrical connection at 114 in FIG. 8. In actual practice, this electrical connection 114 may be made by grounding that side of unit 41 to the metal case of the camera, and also grounding portion 106 of contact 104 to the case as seen in FIG. 5. Into the two leads 110 and 111 there are connected two fixed resistors 171 and 172. Each of these fixed resistors acts as a series resistance in a circuit which includes one of the photovoltaic cells and the moving coil. Each acts to add external resistance to the circuit with respect to the photocell, and thereby gives the desired relationship between energization of cell and movement of coil. Proper selection of relative values for these resistors will serve to offset the minor departures from standard output that may be encountered in run-of-the-mill cells, thus aiding in manufacture.

The moving coil device 41 acts when energized to turn a driven shaft 115 (see FIG. 8) and a carried gear 116. The iris mechanism 42 which is driven by gear 116 may include a second gear 117 meshing with gear 116, and also meshing with teeth formed on the periphery of two iris discs 118 and 119. These discs are mounted to turn about axes which are parallel to one another but offset relative to one another, so that a pair of circularly advancing tapered apertures 120 in the two discs will coact to form at 121 an aperture whose effective size varies in response to rotation of discs 118 and 119 resulting from actuation of electrically operated unit 41. This type of iris mechanism is illustrated only as one typical form of iris structure which can be employed, it being understood however that any suitable type of electrically operable iris mechanism can be substituted. The light passing aperture 121 formed by the two coacting closely adjacent discs 118 and 119 is aligned with the lens 12 which is in active position, so that the image from lens 12 passes through aperture 121 and then through the usual shutter mechanism diagrammatically represented at 122, and onto a film which is moved into position by the usual film advancing mechanism diagrammatically represented at 123.

In order to allow maintenance of the iris mechanism in a particular set position irrespective of changes in the light energization of the photoelectric cells, I provide a latch element 124 (see FIG. 8), which is pivoted by a shaft 125 for rotation about an axis typically parallel to axes 23, 24 and 33, and which has an arm 126 whose end is engageable with the teeth of gear 116 to lock the gear against rotation. A suitable spring detent element 127 may be provided for releasably retaining the rotatably movable latch element 124 in either its active or released position. The main body portion of latch element 124 may be circular as shown, and have a portion of its periphery projecting outwardly through an aperture in the side of camera housing 15, as seen in FIG. 1, so that the latch element may be actuated manually between active and released positions by manipulation of this outwardly projecting portion of the latch element.

To now describe the manner of use of the first form of the invention shown in FIGS. 1 through 8, assume first that it is desired to take motion pictures with the camera using incident light actuation, and using a film having an ASA sensitivity of 10. Also assume that the pictures are to be taken at the standard speed of 16 frames per second (indicating a particular shutter time corresponding to this 16 frame per second speed). In order to preset valves 58 and 59 for these conditions, the user merely turns control element 87 at the front of the camera to the position represented in FIG. 7, in which the marking designating 16 frames per second is located opposite and in exact alignment with the marking designating a film sensitivity of 10 on the ASA scale. This movement of element 87 acts through arms 77 and 78 to move valve plates 58 and 59 vertically to proper positions for taking motion pictures under the indicated conditions. Next, the operator pushes the push-button 94 forwardly, that is he pushes inwardly on the end of the push-button which is located at the same side of part 16 as is the incident light acceptance unit 18 (since it is desired that the incident light acceptance apparatus be rendered operative). This position is the full line position represented in FIG. 5.

In order to take pictures, the operator then merely points the lens 12 in the direction of the desired scene, views the scene through view finder eye piece 20 and window 21, and commences operation of the shutter and film advancing mechanism at the desired time. The iris mechanism 42 is automatically adjusted by electrically operated moving coil unit 41 in accordance with the amount of light which impinges upon incident light acceptance unit 18, and passes from the interior of that collector dome to the exposed portion of photoelectric cell 35. This cell develops an electric current which is proportional to the light energization of the cell, and which actuates unit 41 sufficiently to provide the proper lens aperture 121 for producing an optimum photograph under the particular incident light conditions then encountered, assuming of course the shutter speed and film sensitivity for which control element 87 has already been set.

If it is now desired to take pictures utilizing the reflected light automatic control, the operator merely presses push-button 94 to the broken line position of FIG. 5, and continues to take pictures in the same manner as previously. The transmission characteristics of the two light acceptance units 17 and 18, and of the two valves 58 and 59, as well as the sensitivities of the two cells 34 and 35, are all predesigned and so related that the single setting of control element 87 properly presets both of the valve elements in a manner such that either incident light or reflected light actuation may be employed for the same setting. That is, if the control element 87 is in the setting of FIG. 7, then the valves are properly preset for 16 frames per second and film of No. 10 ASA sensitivity regardless of whether push-button 94 is in the incident light or reflected light condition. Preferably, the apparatus is designed to assume that, when the reflected light acceptance unit 17 is in use, the photographic scene will reflect between about 15 and 20 percent (desirably 18 percent) of the available light toward the camera, with the two cells 34 and 35 then functioning, under such assumed reflectance conditions, to actuate the iris mechanism to exactly the same positions regardless of which of these cells may be in use. (Stated differently, if the camera is pointed toward a scene having a predetermined average reflectance between about 15 and 20 percent (preferably 18 percent), with the lighting which is incident at the camera locataion being essentially the same as that incident at the subject location, then both of the two cells 34 and 35 will actuate the iris to the same setting. This should be true in all conditions of the valves.) With regard to the sensitivity of the cells 34 and 35 per se, it is desirable that these cells be so designed that, in all settings of the valves, a predetermined essentially constant ratio is maintained between the relative sensitivities of the reflected light cell and the incident light cell. For best results, it is preferred that the reflected light cell be between about 2.5 and 4 times as sensitive to a given intensity of illuminataion as is the incident light cell, that is, the electrical current developed by the reflected light cell should be between about 2.5 and 4 times that developed by the other cell. If the sensitivity per unit area of the two cells is the same, this means that the exposed area of the reflected light cell should be between 2.5 and 4 times as great as the exposed area of the incident light cell in any particular setting of the valves.

If a situation is met in which it is felt that an incident light type of actuation should be employed, but the incident light measurement should be taken at the location of the photographic subject, then the operator merely takes the camera to that location, holds the camera in a position in which it is pointing in the same direction in which it will be pointing when the picture is ultimately taken, and then actuates lock element 124 to releasably latch the iris mechanism in the position to which it is set by the amount of incident light falling on dome 18 at that subject location. With the iris then locked in the proper setting, the photographer may return to the desired camera location, and take the picture with the iris secured in its proper setting.

FIG. 9 represents fragmentarily a variational form of the invention in which the camera is semi-automatic, rather than being completely automatic. In this form, there is represented at 41a an electrically actuated moving coil device corresponding to that shown at 41 in FIG. 8, and which device has associated with it all of the light acceptance apparatus, photoelectric cells, valves, and selector switch apparatus shown in FIG. 8, except that unit 41a does not directly actuate the iris mechanism. Instead, the unit 41a merely actuate a pointer 127, with which the photographer may manually align a second pointer 128 by means of a manually actuable gear wheel 129 typically located at the front of the camera. This gear 129 and pointer 128 are mounted by a shaft represented at 130 for rotary adjusting movement about the axis 131 about which pointer 127 turns. Actuation of gear 129 and pointer 128 in turn actuates a meshing gear 132, which operates a conventional iris mechanism within the lens assembly 133 of the camera. The operator uses the camera of FIG. 9 in the same manner as that of FIGS. 1 to 8, except that, when the camera is properly positioned and preset for the taking of a picture, with push-button 94 and actuating element 87 properly preset, then the operator actuates control gear or knob 129 to align pointer 128 axially with the position to which pointer 127 has been turned by electrical light-induced actuation of unit 41a, to in this way set the iris mechanism to a setting corresponding to that which is automatically attained by the mechanism 42 of the FIG. 8 arrangement.

FIGS. 10 through 15 show a portion of another form of camera embodying the invention, which may be considered to be essentially identical with that of FIGS. 1 to 8 except as to the construction of the light valves and their manner of actuation. The valves in this form of the invention embody the features of the valves disclosed in my copending applications Serial No. 813,752 filed May 18, 1959 now Patent No. 3,041,929 on "Light Valve Structure"; and Serial No. 813,744 filed May 18, 1959 now abandoned on "Device Utilizing a Light Valve Actuated by a Light Acceptance Unit." The two photoelectric cells 34b and 35b of FIGS. 10–15, and their electrical connection to the moving coil unit (41 in FIG. 8) may be identical with FIGS. 1 to 8. However, instead of the valves 58 and 59, the FIGS. 10 to 15 form of the invention includes two valve assemblies 58b and 59b, each of which includes two relatively rotatable aperture metal opaque valve plates (158b and 258b, and 159b and 259b), pivoted together by rivets 135 and 136 for relative rotation about axis 33b.

The two inner valve plates 158b and 159b are retained against rotation relative to body 16b by reception of two pins 130 and 131 within notches 132 and 133 formed in the otherwise circular peripheral edges of these plates (see edge 134 in FIG. 11). The other two plates 258b and 259b, on the other hand, are operatively connected to light acceptance units 17b and 18b, and are rotatable therewith about axis 33b. For this purpose, plate 258b has a plurality of axially turned ears 137 which are received within shallow notches or grooves 138 in ring 53b in a relation rotatively keying plate 258b to that ring, and thereby to the carried acceptance unit 17b. Similarly, plate 259b has ears 139 received within grooves in ring 45b.

Instead of cementing rings 53b and 45b to part 16b as in FIGS. 1–8, these two rings are merely releasably retained against axial separation from part 16b, while still allowing rotation of the rings and carried acceptance units and valve plates. Such retention of the rings is effected by providing each ring with a spring 140 (see FIG. 14) extending arcuately within a groove 141 in the inner surface of the ring, and having two ends turned outwardly to form detent fingers 142 projecting outwardly through apertures in the ring (45b or 53b) and received within an annular groove 143 in part 16b.

The two rings 45b and 53b are rigidly interconnected for rotation in unison, by attachment to a common rigid connector strap 144, which may have a window 145 (FIG. 13) coacting with an arcuate film sensitivity scale 146 on part 16b to indicate the setting of the valves (this typical marking arrangement assumes a predetermined camera speed or shutter time, and therefore has no scale corresponding to scale 87 of FIG. 7). The rotation of actuating member 144 and the attached parts may be limited by engagement of each of the two pins 130 and 131 with the ends of an arcuate recess formed in the associated rotating valve plate 258b or 259b (for example by engagement of pin 130 in FIG. 11 with the ends 147 and 148 of arcuate peripheral recess 149 in plate 258b). In this connection, it should perhaps be pointed out that pin 130 is desirably carried by snap ring 51b, and may have its radially outer portion partially received within an inner groove in part 16b to properly locate the pin circularly about axis 33b.

Each of the valve plates 158b and 159b has a series of circularly spaced apertures of the shape shown at 150 in FIG. 11, and coacting with apertures 151 in plates 258b and 259b (as discussed in greater detail in my copending application Serial No. 813,752 filed May 18, 1959 on "Light Valve Structure"), with these apertures 150 and 151 being designed to progressively increase the effective light passing area of each valve in geometric progression steps (progressive doubling) in response to movement of control element 144 through arithmetic progression steps. The constant predetermined relationship between reflected light response and incident light response in the different valve settings is the same as has been discussed in connection with the first form of the invention. Also the switch 93b may function the same as in FIGS. 1–8, though it may typically be positioned somewhat differently as shown. The device of FIGS. 11–15 is used exactly the same as that of FIGS. 1–8 except for the different manner of actuation of the valves.

I claim:

1. The combination comprising a camera including a main housing having forward and rear ends and including a lens facing in a forward direction relative to the housing, an electrically actuated device for exposure control carried by the camera, a reflected light acceptance unit carried by the camera and facing in the same forward direction as said lens and constructed to accept light from only a predetermined angle, an incident light acceptance unit carried by the camera and including a translucent convex light collector dome facing in a rearward direction the opposite of said forward direction in which the camera lens and reflected light acceptance unit face, a mounting structure on said main housing which is small as compared with said main housing and projects upwardly therefrom at said forward end of the main housing and carries said incident light acceptance unit above the forward end of the housing, two photoelectric cells positioned in the paths of light transmitted by said two light acceptance units respectively, and electrical control circuitry including switch means operable to selectively connect either one of said cells, individually, to said electrically actuated device in a relation to energize the device.

2. The combination as recited in claim 1, including locking means for releasably locking said electrically actuated device in any of different settings to which it is actuable by the one of said cells which is responsive to incident light.

3. The combination as recited in claim 1, including two light valve elements mounted in the path of light to said two cells respectively and mounted for sliding movement transversely of the direction in which said lens faces, a rotatably movable control shaft, two actuating links mounted to turn with said shaft, said two valve elements containing cam slots, means carried by said two links and receivable in said slots respectively and operable to cam the two valve elements respectively in a relation to slidably actuate both of said valve elements in unison in response to rotary swinging movement of the shaft and links, a manually operable control element connected to said shaft for manually turning it, and markings for indicating different adjustment positions of said control element suitable for different camera shutter exposure times and different sensitivities of film in the camera.

4. The combination as recited in claim 1, in which the light passing characteristics of said two acceptance units and the sensitivities of the two cells are so related that if the camera is pointed toward a scene having a predetermined average reflectance between about 15 and 20 percent, with the illumination which is incident at the camera location being essentially the same as that at the subject location, then either one of said cells, taken individually, will actuate said electrically responsive device to the same setting as the other cell, other factors being equal.

5. The combination as recited in claim 1, including two adjustable light valves positioned in the path of light to said two cells respectively, and a single valve control for actuating said two valves in unison, markings for indicating different adjustment positions of said control element suitable for different camera shutter exposure times and different sensitivities of film in the camera, said valves being so constructed and related that in the different settings of the valves a predetermined essentially constant ratio is maintained between the relative sensitivities of said reflected light cell and said incident light cell.

6. The combination comprising a camera including a main housing having forward and rear ends and including a lens facing in a forward direction relative to the housing, an electrically actuated device for exposure control carried by the camera, a reflected light acceptance unit carried by the camera and facing in the same forward direction as said lens and constructed to accept light from only a predetermined angle, an incident light acceptance unit carried by the camera and including a translucent convex light collector dome facing in a rearward direction the opposite of said forward direction in which the lens and reflected light acceptance unit face, a mounting structure on said main housing which is small as compared with said main housing and projects upwardly therefrom at said forward end of the main housing and carries said incident light acceptance unit above the forward end of the housing, two photoelectric cells positioned in the path of light received by said two light acceptance units respectively, electrical control circuitry including switch means operable to selectively connect either of said cells individually to said electrically actuated device in a relation to energize the device, and an iris mechanism automatically actuable by said electrically actuated unit in response to the light energization of said cells.

7. The combination as recited in claim 6, including two adjustable light valves positioned in the path of light to said two cells respectively, and a single valve control for actuating said two valves in unison, markings for indicating different adjustment positions of said control element suitable for different camera shutter exposure times and different sensitivities of film in the camera, said valves, acceptance units and cells being so constructed and related that if the camera is pointed toward a scene having a predetermined average reflectance between about 15 and 20 percent, with the lighting which is incident at the camera location being essentially the same as at the subject location, then either of said two cells will actuate said unit and thereby said iris mechanism to the same setting, and will do so in any of different settings of the valves.

8. The combination comprising a camera including a main housing having forward and rear ends and including a lens facing in a forward direction relative to the housing, an electrically actuated device for exposure control carried by the camera, a reflected light acceptance unit carried by the camera and facing in the same forward direction as said lens and constructed to accept light from only a predetermined angle, an incident light acceptance unit carried by the camera and including a translucent convex light collector dome facing in a rearward direction the opposite of said forward direction in which the camera lens and reflected light acceptance unit face, a mounting structure on said main housing which is small as compared with said main housing and projects upwardly therefrom at said forward end of the main housing and carries said incident light acceptance unit above the forward end of the housing, two photoelectric cells positioned in the paths of light transmitted by said two light acceptance units respectively, two adjustable light valves positioned in the paths of light to said two cells respectively, a common valve control for actuating said two valves in unison, and markings for indicating different adjustment positions of said control suitable for different camera shutter exposure times and different sensitivities of film in the camera.

9. The combination comprising a camera including a housing having a relatively large main portion with forward and rear ends and carrying a forwardly facing lens, said housing having a smaller portion projecting upwardly from said main relatively large portion thereof and located at the forward end thereof, an incident light acceptance unit carried above the forward end of said main portion of the housing by said upwardly projecting portion of the housing and facing in a rearward direction the opposite of the direction in which said lens faces, said incident light acceptance unit including a translucent convex light collector dome, a light responsive element positioned in the path of light received by said light acceptance unit, an electrically actuated unit operable by said light responsive element, an iris mechanism automatically actuable by said electrically actuated unit in response to the light energization of said light responsive element, and a locking means for releasably locking said iris mechanism in any of the different settings to which it is actuable by said electrically actuated unit.

References Cited in the file of this patent
UNITED STATES PATENTS

| | | |
|---|---|---|
| 2,131,028 | Goodsell | Sept. 27, 1938 |
| 2,145,147 | Wolfery | Jan. 24, 1939 |
| 2,186,613 | Mihalyi | Jan. 9, 1940 |
| 2,206,086 | Galyon | July 2, 1940 |
| 2,261,532 | Tonnies | Nov. 4, 1941 |
| 2,509,366 | Perlin | May 30, 1950 |
| 2,655,086 | Walker | Oct. 13, 1953 |
| 2,667,809 | Williams | Feb. 2, 1954 |
| 2,841,064 | Bagby et al. | July 1, 1958 |